July 6, 1937. H. J. L. FRANK Re. 20,436

BUS DUCT

Original Filed Feb. 15, 4 Sheets-Sheet 1

INVENTOR
Harrison J. L. Frank
BY
Francis D. Hardesty
ATTORNEY

July 6, 1937. H. J. L. FRANK Re. 20,436

BUS DUCT

Original Filed Feb. 15, 1932 4 Sheets-Sheet 2

INVENTOR
Harrison J. L. Frank
BY
Francis D. Hardesty
ATTORNEY

BUS DUCT

Original Filed Feb. 15, 1932 4 Sheets-Sheet 3

INVENTOR
Harrison J. L. Frank
BY
Francis D. Hardesty
ATTORNEY

July 6, 1937. H. J. L. FRANK Re. 20,436
BUS DUCT
Original Filed Feb. 15, 1932 4 Sheets-Sheet 4
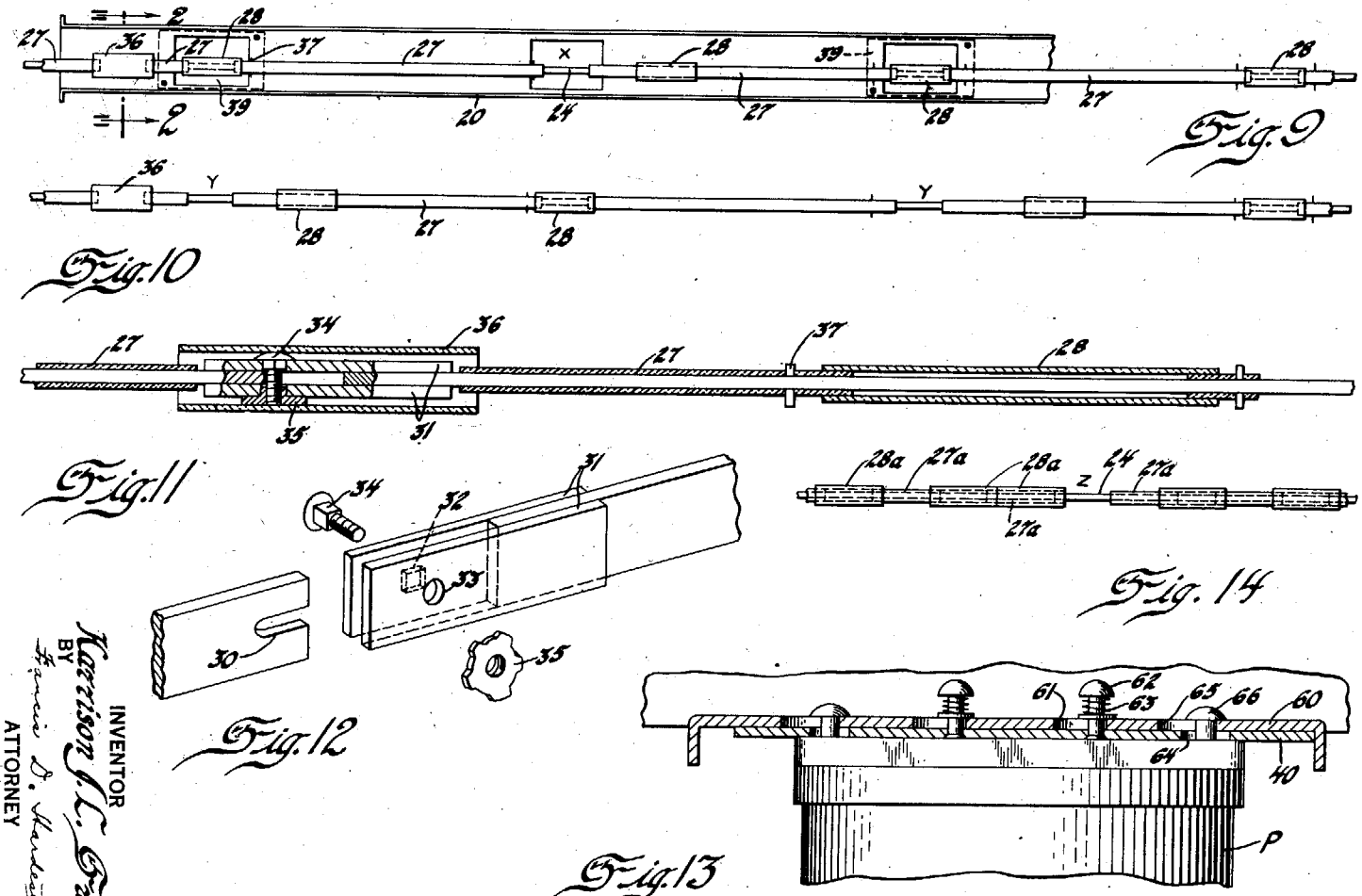
INVENTOR
Harrison J. L. Frank
BY
Francis D. Hardesty
ATTORNEY Reissued July 6, 1937 Re. 20,436

UNITED STATES PATENT OFFICE 20,436

BUS DUCT

Harrison J. L. Frank, Detroit, Mich., assignor to Bulldog Electric Products Company, Detroit, Mich., a corporation of West Virginia Original No. 2,043,796, dated June 9, 1936, Serial No. 592,912, February 15, 1932. Application for reissue June 20, 1936, Serial No. 86,436

31 Claims. (Cl. 247—3)

This invention relates to current distributing systems of the type shown and described and claimed in my prior applications, Serial Nos. 424,423, January 29, 1930, and 454,102, May 20, 1930, for which applications, this application is to be considered an amalgamated continuation in part.

An object of the invention is a bus duct system of electrical distribution which is intended to replace, in industry, older and less efficient systems of electrical distribution.

The embodiments of the invention disclosed hereinafter, include a plurality of bus duct sections of unit or standard manufacturing lengths, joined together to form a continuous, enclosed, distribution system, leading from the point of power input, through factory walls, partitions, etc. up and down floors, etc. to the points of power outlet, namely, electrical consuming devices. In the enclosure part of the bus duct sections and insulated therefrom, are relatively insulated bus bars, from which power may be drawn at desired points through suitable outlets into which may be inserted or plugged, power take-off devices, such as plugs.

Systems answering the general description given above include specific details which form major parts of the inventions of this case. Among the details are (*a*) Novel forms of power outlets.

(*b*) Novel means of insulating the bus bars from each other and from the duct.

(*c*) Novel methods of creating new power outlets and of eliminating old ones.

(*d*) Novel forms of parts not specifically included in the foregoing.

Prior systems of distribution are not as satisfactory as the system disclosed hereinafter, for the following reasons:

(*a*) The novel system is more readily accessible for outlet variation, etc. than older systems, due to the hinged cover on the duct, and also due to the fact that the duct is composed of short sections, joined as desired;

(*b*) The novel system is safer than older systems, since the bus bars are completely insulated, rigidified and spaced, in the grounded duct, and since the original bus bar insulation is never broken, but is merely shifted, as desired, and may be replaced, as desired, without alteration in its insulating characteristics. It will be observed that this feature is not true of insulated cable systems, where the original insulation, when once removed, can not be restored, and must be replaced by a taped joint, which is not as dependable, nor as readily accessible for testing as the original woven insulation;

(*c*) The novel system is more flexible than older systems, due to the ease with which outlets are created or eliminated, due to the ease with which runs are added to a pre-existing system, due to the interchangeability of parts, due to the facility with which plugs of one capacity may be substituted for another, etc., without disturbing the bus duct itself.

(*d*) The novel system is more easily and economically installed, maintained, and altered, than older systems, due to the specific details of construction.

(*e*) The novel system lends itself more readily than older systems to mass or factory production, for the parts thereof are all standardized, to be assembled and installed as required.

(*f*) The novel system, as contrasted with older systems, dispenses with distribution panels, loose wires, etc.

(*g*) The novel system is built up of a plurality of individual sections, each of which, before it is assembled or mounted, is equipped and includes a duct enclosure and the necessary bus bars, insulation, etc.

Still further objects and advantages will readily occur to those skilled in the art upon reference to the following description and the accompanying drawings in which Fig. 1 is an elevation view of a section of the duct, with a current collecting plug shown in place.

Fig. 9 shows a length of bus bar, with outlet spaces at certain points.

Fig. 10 shows the same length of bus bar, but with the outlet spaces at different points.

Fig. 11 is a longitudinal plan cross section view of a length of bus bar.

Fig. 12 shows means for joining adjacent ends of bus bar sections.

Fig. 13 shows plug locking means on a duct.

Fig. 14 shows a modified form of insulation for a bus bar.

Figure 1:
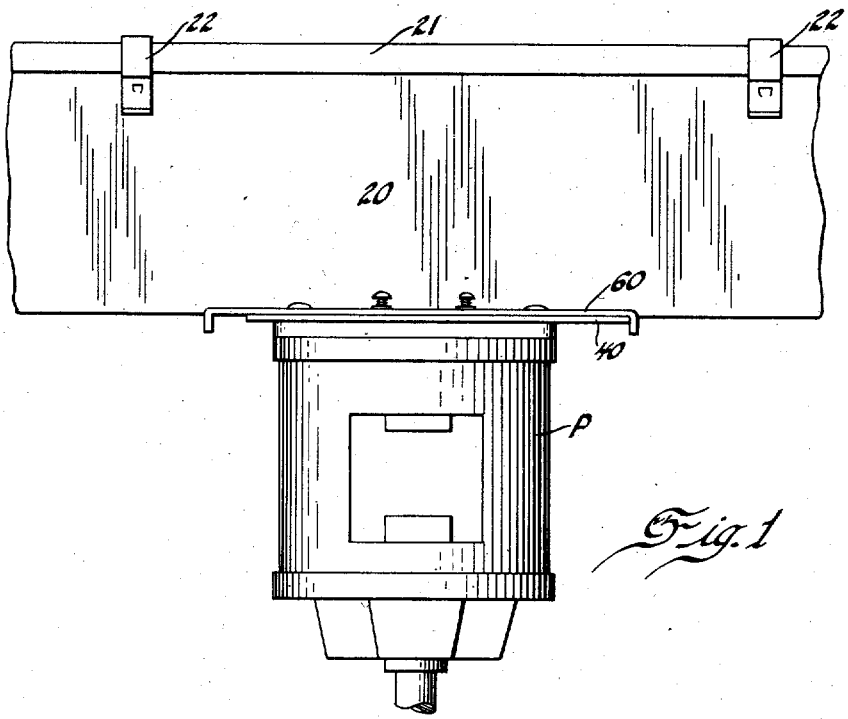
Figure 2:
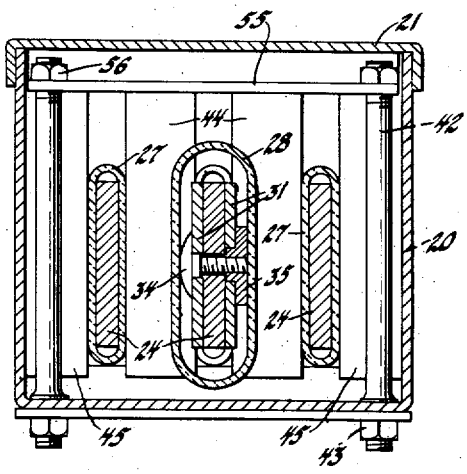
Fig. 2 is a section through the duct.

Referring to the drawings and more particularly to Figs. 1 and 2, it will be seen that the duct 20 which is made of unit or standard lengths (10 feet) joined at their ends, is provided with a hinged cover 21 having spring catches 22. Inside the duct, and spaced and insulated therefrom, are bus bars 24, also made up of unit or standard lengths (10 feet) joined at their ends. Each section of the system is preequipped and includes the enclosing duct and the bus bars. The bottom of the duct may be provided with a number of spaced power outlets into which may be plugged the power collectors of plugs 25, Fig. 1, which per se form no part of the present invention, the same being shown in my copending case, Serial No. 428,291, Feb. 14, 1930.

*The bus bars*

One of the important features of the invention is the means for insulating the bus bars, and such means will now be described, in connection with Figs. 2, 9 and 10. The individual bus bars are covered with long sleeves 27 of rigid insulating material, of such proportions as to fit on the bus bars with a fair degree of friction, whereby they will not shift around on the bus bars, except as caused to do so by the user. The sleeves are so disposed on the bus bars as to leave gaps between their ends, and these gaps are covered by short sleeves 28 of rigid insulating material, these sleeves being large enough to encompass the ends of the small sleeves, with a fair degree of friction. The inner sleeves 27 are usually kept stationary on their bus bars, and the outer sleeves 28 are slid thereover, to expose or conceal the bare spots on the bus bars, between the ends of the inner sleeves. However, the outer sleeves 28 may be kept stationary, and the inner sleeves 27 moved to accomplish the same result without departing from the spirit of the invention.

In Fig. 9 the bus bar 24 is shown as completely insulated by sleeves 27 and 28, except at the bare spot being left for use in a power outlet to be located at that point. When for any reason, the location of the power outlets, and correspondingly of the bare spots, on the bus bars, is to be varied, as for example, to the layout of Fig. 10, suitable sleeves 28 are moved to expose bus bar spots, and certain others may be moved to conceal already existent bare spots on the bus bars. Comparing Fig. 10 with Fig. 9 it will be seen that bare spot X is covered, while new ones, at Y, are created, all this being done without tools, special equipment, taping, etc. These two figures diagrammatically show how the location of power outlets may be varied, multiplied or decreased, merely by shifting the sleeves 28, and it will be understood, of course, that the shiftable sleeve idea, brought out in the foregoing, may be carried out more extensively than shown, if desired.

In Fig. 14 the inner sleeves 27*a* and the outer sleeves 28*a* are of substantially the same lengths, and a gap in the insulation may be created at any point in the bus run.

In Figs. 11 and 12 is shown a joint between adjacent ends of bus bar sections. Each section has an end, slotted as at 30, and an end provided with plates 31, spaced to receive a slotted end 30, and provided with a squared hole 32 and a round hole 33 to receive a screw bolt 34 threaded into a nut 35 to clamp the ends together. The joint may be insulated by an insulating sleeve 36, slidable on the small sleeves 27 to expose the joint.

While the sleeves 27 are shown and described as maintained stationary on the bus bars by their own friction producing proportions, it will be understood that other means, such as wooden pegs 37 may be used to create friction between the sleeves 27 and the bus bars. When such pegs are used, they may be sheared off by the sleeves 28, as the latter are shifted about on the sleeves 27. These pegs also serve to space the short sleeves on the longer ones, uniformly. Further, while two sizes of sleeves are shown, it is obvious that but one size may be employed, the sleeves being shifted to vary the location of the bare spots on the bus bars.

*The power outlets*

At unit centers (20'') on the bottom surface of the duct, are rectangular openings some of which are normally closed by removably mounted rectangular plates 39 which may be removed to expose the interior of the duct and to permit parts being applied to the duct and bus bars to create a power outlet, in the form of a receptacle.

When it is desired to create an outlet in the system, at a desired point, the closing plate at that point, if there be any, is removed and the insulating sleeves 28 on the bus bars are shifted to expose the bus bars at that point. An outlet plate 40 having a central hole, in which is disposed and seated, an insulating receptacle block 41, is placed against the under side of the duct (Fig. 4) and is bolted thereto, by the shouldered, long bolts 42 and the nuts 43 thereon, the bolts then projecting up in the duct, outside of the outer pair of bus bars. Spacer blocks 44 are then placed between the bus bars and other spacer blocks 45 are placed between the outer bus bars and the walls of the duct, the blocks 41, 44 and 45, having cooperating ribs which serve to align the various blocks with respect to one another, properly.

Then, if desired, bus bar contacts (Fig. 6) are passed upwardly through holes 45*a* in the block 41 to straddle the bus bars. Each set of contacts includes a pair of leaves 46, pressed together by the resilient spring and pin device 47, and limited in their separating movement by a rivet 48. The contact leaves 46 are held together, at the top, by a copper block 49, held in place by a bolt 50, passing through the leaves and the block, the block 49 engaging the under surface of a top block, described below, to prevent the bus bars from moving vertically in the duct.

Figure 7:
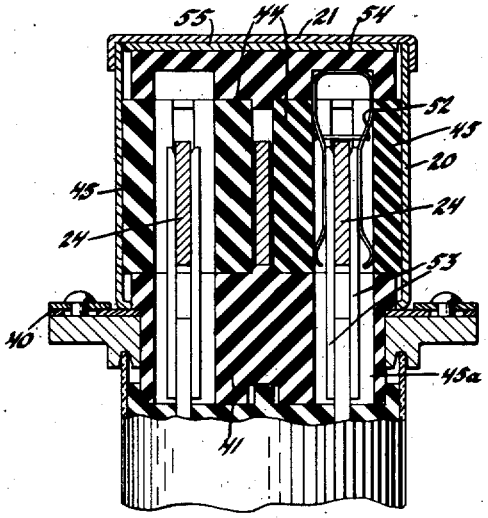
Fig. 7 is a similar view of a slight modification, shown in connection with a second form of plug.
Figure 6:
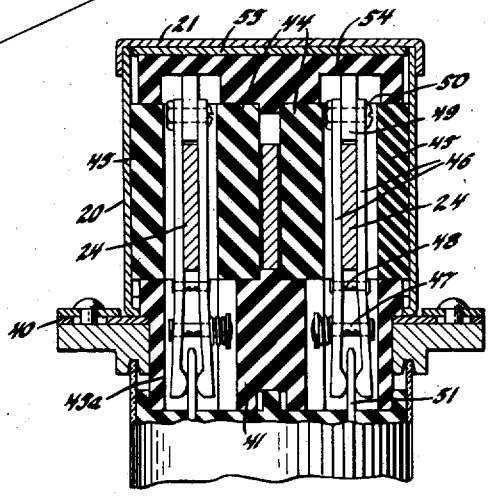
Fig. 6 is a similar view but shown in connection with one form of plug.

The contacts of Fig. 6 are designed to cooperate with male contacts 51 on the outlet plug P. It is possible to provide the outlet plug with female contacts adapted to receive the bus bar directly (Fig. 7) in which case the contacts of Fig. 6 may be dispensed with, or may be replaced by spring leaves 52 straddling the bus bars and pressing the female contacts 53 of Fig. 7 against the bus bar.

After mounting the receptacle block 41, the spacer blocks 44 and 45, and the contacts 46 (if any be used) or the spring leaves 52 (if any be used), a top block 54 is placed on the spacer blocks to complete the insulation of the outlet, and a top plate 55 is mounted on the top block to clamp down the blocks. The top plate is held down by the bolts 42 and nuts 56. This completes the formation of the outlet, and it will be seen that no breaking or cutting of insulation, no taping, and no injuring of parts is necessary in order to create an outlet.

When it is desired to eliminate an outlet at any point, the parts are removed in the following order: nuts 56, top plate 55, top block 54, contact bolts 50, copper block 49, and contact leaves 46, (or contact spring 52), spacer blocks 44 and 45, nuts 43, outlet plate 40 and block 41, and bolts 42. Then the insulating sleeves 28 are shifted to conceal the bare spots on the bus bar, and a rectangular plate 39 is remounted after which the operation of eliminating an outlet is completed.

Figure 3:
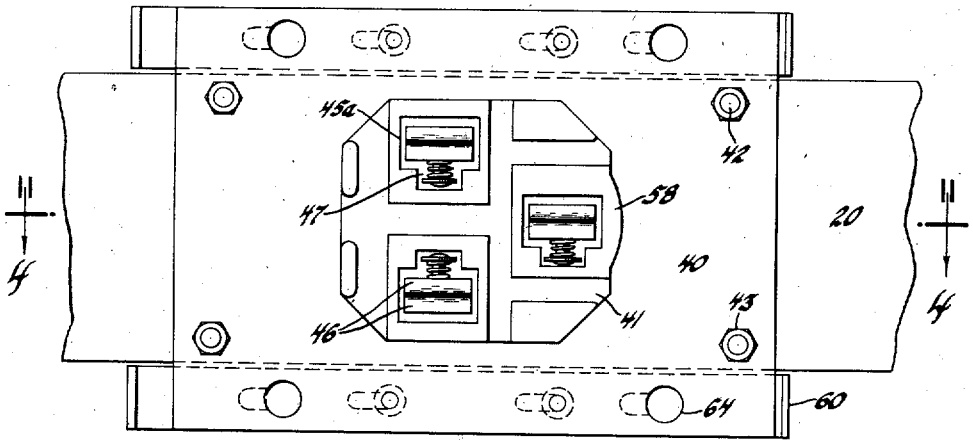
Fig. 3 is a bottom plan view of a power outlet.

In order to polarize the plug with respect to the bus bars, the central hole in the outlet plate is provided with a keying cutout 58 (Fig. 3) which cooperates with a bulge on the outlet block 41 so that the latter can occupy only one position with respect to the plate. The mounting holes for the plate 40 are asymmetrically disposed with respect to the duct opening, and the contact holes 45a in the outlet block 41 are asymmetrically disposed with respect to the block itself, in a well known manner, to effect the polarization of the plug, whose contacts are to pass through the contact holes 45a, with respect to the bus bars.

To reduce manufacturing and assembly and stock costs, the spacer blocks are so formed that the inner ones are identical with each other, and the outer pair are also identical with each other. Further, facing surfaces of any two blocks are made duplicates to reduce the cost of dies, etc. used in making the blocks.

It will be seen that insulating blocks 41, 44, 45, and 54 not only form an outlet, but also serve to rigidify the bus bar grouping with respect to the duct and to space and rigidify the bus bars with respect to each other. Usually the outlets are quite close and take care of the rigidifying and spacing requirements of any bus run, but it sometimes happens that in a long run, there may be no outlets. In order to rigidify a run, not provided with outlets, a grouping of two blocks 54, one above and one below the bus bars, and four spacing blocks 44 and 45, six in all, is created, and mounted around the bus bars, this grouping adequately accomplishing the desired result. Since the parts that are used for a rigidifying group may also be used as parts of an outlet group, it is unnecessary to stock special parts, whose sole function is to rigidify a bus run.

On the outlet plate 40 at its edges, are two slidable locking plates 60 (Fig. 13) having slots at 61 through which pass headed pins 62, there being springs 63 to press the locking plates against the outlet plate. The outlet plate has holes 64 registered with keyhole slots 65 in the locking plate, to cooperate with the headed pins 66 of the plug P, and to secure the plug in place, under the duct. Means, not shown, are provided on the plug to engage the outlet plate and to ground the plug to the duct, which, in turn, like all conduit, is grounded.

Figure 4:
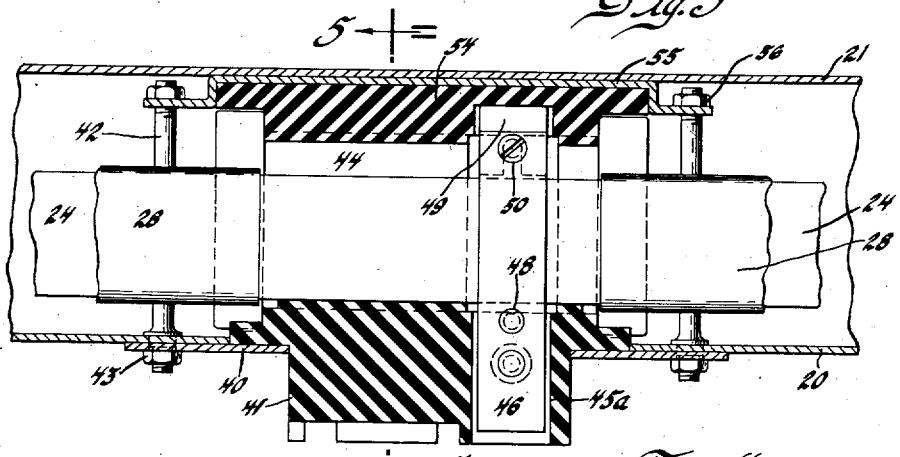
Fig. 4 is a longitudinal section thereof, as if on line 4—4 of Fig. 3.
Figure 5:
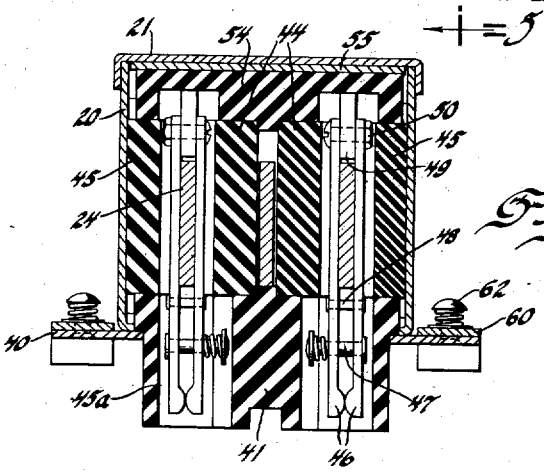
Fig. 5 is a transverse section thereof, as if on the line 5—5 of Fig. 4.
Figure 8:
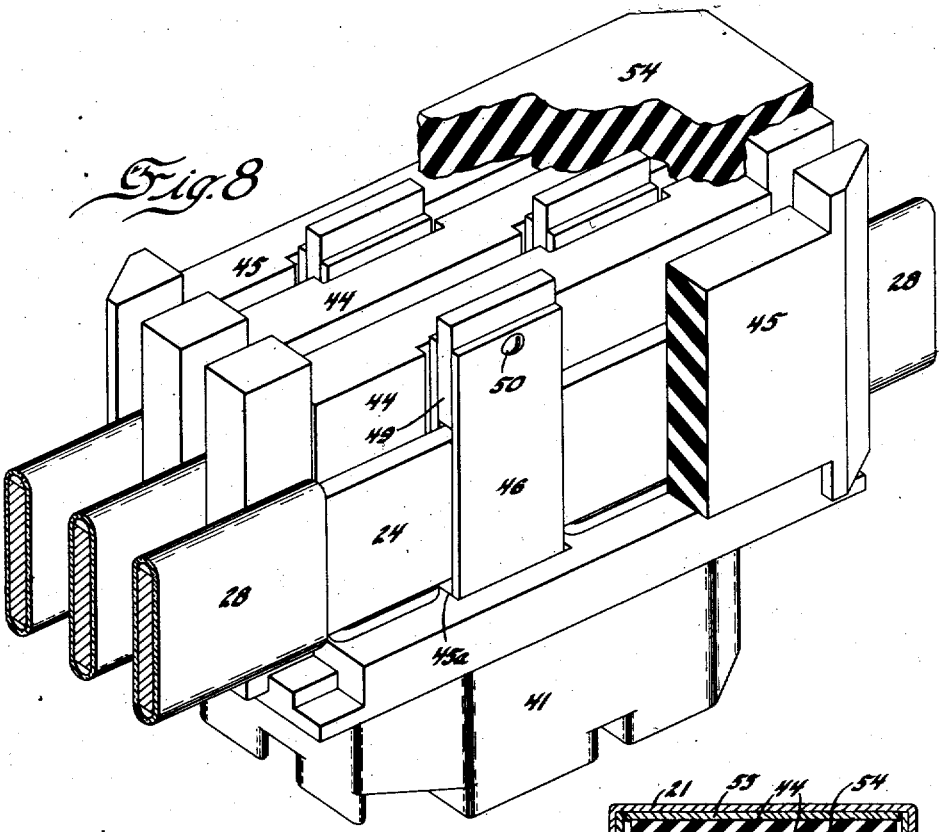
Fig. 8 is a perspective view of the power outlet.

It will be noted that the vertical space between outlet block 41 and top block 54 is greater than the width of the bus bar shown in Figs. 4 and 5. If desired, a wider bus bar, or a narrower one, than the one shown may be used in the duct, without difficulty, or redesign of parts, in order to adapt the system for current-carrying capacities, greater or less than that of the system shown. This feature is of importance in the flexibility of the system.

Now having described the invention and the preferred embodiment thereof, it is to be understood that the said invention is to be limited, not to the specific details herein set forth, but only by the scope of the claims which follow:

What I claim is:

1. An electrical distribution system comprising a long run of duct externally supported on spaced supports and having a cover which may be moved to expose the interior of the duct wherever desired and a plurality of long runs of relatively insulated bus bars in said duct, the duct having a plurality of removable and replaceable portions closely spaced at uniform distances between the duct supports to permit of access to the interior of the duct and to the bus bars at any desired ones of closely and uniformly spaced points between the duct supports, apertured receptacles at certain ones of the aforementioned closely spaced points permitting access to the bus bars from outside the duct at those points through the receptacles, the latter being sectional so that they can be disassembled and removed from their points of location in the duct, and remounted in other of the aforementioned points in the duct, without destruction of receptacle parts, the receptacles having parts which form barriers between bus bars, and between bus bars and the walls of the duct, to insulate them electrically and space them physically from one another and from the duct.

2. In an electrical distribution system, an elongated duct having a wall provided with spaced openings, parallel, elongated bus bars in said duct and having exposed portions alined with certain of said openings, and receptacles in the duct, at the exposed portions of the bus bars, the latter being continuous even as they pass through the receptacles, the latter being assembled on the unsevered bus bars, each of the receptacles including an assembly of separate insulating blocks proportioned to be mountable on the bus bars in the duct, through the openings, without mutilation of the bus bars, the ducts, or the blocks themselves, one of which projects through the duct opening and is provided with spaced holes through which may be passed, from the outside, means to make electrical contact with the naked bus bars.

3. In an electrical distribution system, an elongated duct having a wall provided with spaced openings, parallel, elongated bus bars in said duct, and means at the openings to support, space, and insulate the bars with respect to each other and with respect to the duct walls, the means comprising a plurality of insulating blocks some of which are disposed between the bus bars and others of which are disposed between the bus bars and the duct walls, the blocks being assembled on the bus bars without severing the latter, these being continuous, from end to end, even as they pass by the openings, the blocks being proportioned to be mountable on the bus bars in the duct, through the openings, without mutilation of the bus bars, or the blocks themselves.

4. In an electrical distribution system, an elongated duct having a wall provided with spaced openings, parallel, elongated bus bars in said duct and having exposed portions aligned with certain of said openings, and receptacles in the duct, at the exposed portions of the bus bars, the latter being continuous even as they pass through portions of the receptacles, the latter being assembled on the unsevered bus bars, each of the receptacles including an assembly of separate insulating blocks, one of which projects through the duct opening and is provided with spaced holes through which may be passed, from the outside, means to make electrical contact with the naked bus bars, and others of which are disposed between the bus bars and between the latter and the duct walls, these blocks serving as insulating barriers for the bars, as well as bus rigidifying and spacing means.

5. In an electrical distribution system, an elongated duct having a wall provided with spaced openings, parallel, elongated bus bars in said duct, and means at the openings to support, space, and insulate the bars with respect to each other and with respect to the duct walls, the means comprising a plurality of insulating blocks, some of which are disposed between the bus bars and others of which are disposed between the bus bars and the duct walls, the blocks being assembled on the bus bars without severing the latter, these being continuous, from end to end, even as they pass by the openings, certain of the blocks being designed so as to be useful, not only as spacing and insulating blocks, but as parts of an outlet receptacle, if one is to be substituted for the spacing means.

6. In an electrical distribution system, a sheet metal duct of substantially rectangular cross section having an opening in one of its surfaces, a plurality of parallel bus bars longitudinally disposed in the duct and passing said opening, and means forming an outlet or receptacle at the opening, said means including a plurality of separate insulating blocks disposed between and around the bus bars at the opening and insulating of the bus bars from one another and from the walls of the duct, the blocks being separate and independent and of a size whereby they will be capable of being assembled on the bus bars through the opening to form a receptacle, or being disassembled from the bus bars and removed through the opening, without disturbing the bars, the blocks filling substantially the entire volume of the duct at the opening and being held therein by the walls of the duct and the bus bars.

7. In an electrical distribution system, a sheet metal duct of substantially rectangular cross section having an opening in one of its surfaces, a plurality of parallel bus bars longitudinally disposed in the duct and passing said opening, and means forming an outlet or receptacle at the opening, said means including a plurality of separate insulating blocks disposed between and around the bus bars at the opening and insulating the bus bars from one another and from the walls of the duct, the blocks being separate and independent and of a size whereby they will be capable of being assembled on the bus bars through the opening to form a receptacle, or being disassembled from the bus bars and removed through the opening, without disturbing the bars, the blocks filling substantially the entire volume of the duct at the opening and being held therein by the walls of the duct and the bus bars, the assembly of blocks being provided with a portion projecting into and filling the duct opening and having plug contact receiving apertures.

8. In an electrical distribution system, a sheet metal duct of substantially rectangular cross section having an opening in one of its surfaces, a plurality of parallel bus bars longitudinally disposed in the duct and passing said opening, and means forming an outlet or receptacle at the opening, said means including a plurality of separate insulating blocks disposed between and around the bus bars at the opening and insulating the bus bars from one another and from the walls of the duct, the blocks being separate and independent and of a size whereby they will be capable of being assembled on the bus bars through the opening to form a receptacle, or being disassembled from the bus bars and removed through the opening, without disturbing the bars, the blocks filling substantially the entire volume of the duct at the opening and being held therein by the walls of the duct and the bus bars, the assembly of blocks being provided with a portion projecting into and filling the duct opening and having plug contact receiving apertures provided with contact receiving sockets.

9. In an electric distributing system, an open-ended tube of substantially uniform cross section throughout its length provided in one side with openings, means within and adjustable longitudinally of the tube to any point thereof for supporting bus bars, including a block of insulating material having a base extending longitudinally of the tube and provided at substantially the longitudinal median line thereof with a longitudinally extending rib, insulating material within the tube upon opposite sides of the base, bushing means projecting from the block through certain one of the tube openings, bus bars extending longitudinally of the tube, two of said bars being between the rib and insulating material, and the third extending longitudinally of the rib, and electrical conductors secured to said bus bars and extending outwardly at least partially through the block and bushing means aforesaid.

10. In an electric distributing system, an open-end tube of substantially uniform cross section throughout its length provided in one side with openings, bus bars extending longitudinally of said tube, means within and adjustable longitudinally of the tube for supporting said bus bars including a block of insulating material having a longitudinally extending rib serving as a seat for one of said bus bars, opposite sides of the rib receiving the other bus bars, insulating means projecting from the block through a certain one of the openings in the tube, and electrical conductors connected to the bus bars and extending outwardly at least partially through the block and insulating means aforesaid.

11. In an electric distributing system, a closed trough of substantially uniform cross section throughout its length provided in one side with openings, means within and adjustable longitudinally of the trough to any point thereof for supporting bus bars, including a block of insulating material having a base extending longitudinally of the trough, insulating material within the trough upon opposite sides of the base, bushing means projecting from the block through a certain one of the openings, bus bars extending longitudinally of the trough, two of said bars being between portions of the base and insulating material, and electrical conductors secured to said bus bars and extending outwardly at least partially through the block and bushing means aforesaid.

12. In an electric distributing system, an open-ended tube of substantially uniform cross section throughout its length provided in one side with openings, means within and adjustable longitudinally of the tube to any point thereof for supporting bus bars, including blocks of insulating material having bases extending longitudinally of the tube and provided at substantially their longitudinal median lines with longitudinally extending ribs, insulating material within the tube upon opposite sides of the bases, bushing means projecting from the blocks through certain of the openings, bus bars extending longitudinally of the tube, two of said bars being between the ribs and insulating material, and the third extending lonigtudinally of the ribs, and electrical conductors secured to said bus bars and extending outwardly at least partially through the blocks and bushing means aforesaid.

13. In an electric distributing system, an open-ended tube of substantially uniform cross section through its length provided in one side with openings, means within and adjustable longitudinally of the tube to any point thereof for supporting bus bars, including blocks of insulating material having bases extending longitudinally of the tube and provided at substantially their longitudinal median lines with longitudinally extending ribs, said ribs and bases having openings in alignment with certain of the openings, bus bars extending longitudinally of the tube, one on each side of the ribs, and one extending longitudinally of the ribs, and electrical conductors secured to said bus bars and extending outwardly at least partially through the openings in the ribs and bases and through certain of the openings in the tube.

14. In an electric distribution system, an open-ended tube of substantially uniform cross section throughout its length provided in one side with openings, bus bars extending longitudinally of said tube, means within and adjustable longitudinally of the tube for supporting said bus bars including blocks of insulating material having longitudinally extending ribs serving as seats for one of said bus bars and having longitudinally extending recesses upon opposite sides of the ribs, the other bus bars being on opposite sides of the ribs, insulating means projecting from the blocks through certain of the openings in the tube, and electrical conductors connected to the bus bars and extending at least partially through the blocks and insulating means aforesaid.

15. In an electric distributing system, a closed trough of substantially uniform cross section throughout its length provided in one side with openings, means within and adjustable longitudinally of the trough to any point thereof for supporting bus bars, including blocks of insulating material having bases extending longitudinally of the trough, insulating material within the trough upon opposite sides of the bases, bushing means projecting from the blocks through certain of the openings, bus bars extending longitudinally of the trough, two of said bars being between portions of the bases and insulating material, and electrical conductors secured to said bus bars and extending outwardly at least partially through the blocks and bushing means aforesaid.

16. In an electric distributing system, a closed trough of substantially uniform cross section throughout its length provided in one side with openings, means within and adjustable longitudinally of the trough to any point thereof for supporting bus bars, including blocks of insulating material having bases extending longitudinally of the trough, said bases having openings in alignment with certain of the openings, bus bars extending longitudinally of the trough and mounted on the bases, and electrical conductors secured to said bus bars and extending outwardly at least partially through the openings in the bases and through certain of the openings in the trough.

17. In an electrical distribution system, an elongated duct having a wall provided with spaced openings, parallel, elongated bus bars in said duct and having exposed portions aligned with certain of said openings, and receptacles in the duct, at the exposed portions of the bus bars, the latter being continuous even as they pass through portions of the receptacles, the latter being assembled around the unsevered bus bars, the receptacles including portions projecting through the duct openings and provided with spaced holes through which may be passed, from the outside, means to make electrical contact with the bus bars, and portions disposed between the bus bars and between the latter and the duct walls, these receptacles serving as insulating barriers for the bars, as well as bus rigidifying and spacing means.

18. In an electrical distribution system, an elongated duct having a wall provided with spaced openings, parallel, elongated bus bars in said duct and having exposed portions aligned with certain of said openings, and receptacles in the duct at the exposed portions of the bus bars, including portions projecting through the duct opening and provided with spaced holes through which may be passed, from the outside, means to make electrical contact with the bus bars, and contacts straddling and in contact with the naked bus bars and disposed in alignment with said receptacle holes so as to be accessible through the latter, from the outside.

19. In an electrical distribution system, an elongated duct having a wall provided with spaced openings, parallel, elongated bus bars in said duct, and means at the openings to support, space, and insulate the bars with respect to each other and with respect to the duct walls, the means comprising a plurality of insulating portions, some of which are disposed between the bus bars and between the bus bars and the duct walls, the portions being assembled with respect to the bus bars without severing the latter, these being continuous, from end to end, even as they pass by the openings, certain of the portions being designed so as to be useful, not only as spacing and insulating means, but as parts of an outlet receptacle.

20. In an electrical distribution system, a sheet metal duct of substantially rectangular cross section having openings in one of its surfaces, a plurality of parallel bus bars longitudinally disposed in the duct and passing said openings, and means forming outlets or receptacles at the openings, said means including a plurality of separate insulating blocks disposed between and around the bus bars at the openings and insulating the bus bars from one another and from the walls of the duct, the blocks being separate and independent and of a size whereby they will be capable of being assembled on the bus bars to form receptacles, or being disassembled from the bus bars and removed without disturbing the bars, the blocks covering substantially the entire area of the duct wall at the openings and being held therein by the walls of the duct and the bus bars.

21. In an electrical distribution system, a sheet metal duct of substantially rectangular cross section having openings in one of its surfaces, a plurality of parallel bus bars longitudinally disposed in the duct and passing said openings, and means forming outlets or receptacles at the openings, said means including a plurality of separate insulating blocks disposed between and around the bus bars at the openings and insulating the bus bars from one another and from the walls of the duct, the blocks being separate and independent and of a size whereby they will be capable of being assembled on the bus bars to form receptacles, or being disassembled from the bus bars and removed without disturbing the bars, the blocks covering substantially the entire area of the duct wall at the openings and being held therein by the walls of the duct and the bus bars, the blocks being provided with portions projecting into and filling the duct openings and having conductor receiving apertures.

22. An electrical distribution system comprising a long run of duct externally supported on spaced supports and having a cover which may be moved to expose the interior of the duct wherever desired and a plurality of long runs of relatively insulated bus bars in said duct, the duct having a plurality of openings closely spaced at uniform distances between the duct supports to permit of access to the interior of the duct and to the bus bars at any desired ones of closely and uniformly spaced points between the duct supports, these openings having shiftable shutters, apertured plug prong receiving insulator housing structures within the duct at certain ones of the aforementioned openings, which openings permit of plug prong insertion to the bus bars from outside the duct at those points, the housings receiving the prongs and isolating them from one another when the prongs are inserted and being so constructed and arranged as to confine arcs formed on separation of prongs from bus bars to the immediate vicinity of the prongs and to the interiors of the housings, the housings being readily separable from or mountable on the bus bars and in the duct without requiring the disassembly of the duct or the bus bars, these being continuous, from end to end, even as they pass housings, and being so formed and dimensioned with respect to the duct openings that they can be removed from the duct or inserted into the duct through the openings.

23. In an electrical distribution system, a sheet metal duct of substantially rectangular cross section having an opening in one of its surfaces, a plurality of parallel bus bars longitudinally disposed in the duct and passing said opening, and means forming an insulating outlet or receptacle structure at the opening, said means being disposed between and around the bus bars at the opening and insulating the bus bars from one another and from the walls of the duct, the structure being so formed and so dimensioned that it is capable of being assembled on the bus bars through the opening to form a receptacle structure, or being disassembled from the bus bars and removed through the opening, without disturbing the bars, the structure having plug prong receiving holes arranged to confine arcs formed on separation of prongs from bus bars to the interior of the structure and to the immediate vicinity of the prongs.

24. In an electrical distribution system, a duct having a wall normally stationary with respect to the duct as a whole and provided with an opening, a bus bar having a portion exposed at said hole whereby it may be engaged by a bus bar engaging prong of a branch circuit plug inserted into the duct through said hole, an insulation structure having a part so proportioned to the hole that it may be projected therethrough, and having a part so proportioned to the hole that it may not be projected therethrough, the shoulder thus provided engaging said duct wall to limit movement of the structure in the duct hole, the structure sealing the hole and adapted to be assembled with respect to the duct around the bus bar and removed from the duct and from around the bus bar without requiring severance or mutilation of the bus bar, the structure having a part provided with a surface outside the duct, the structure having a prong way opening to the surface and leading into the duct to a bus bar, the structure isolating the prong way.

25. In an electrical distribution system, a duct having a wall normally stationary with respect to the duct as a whole and provided with an opening, a bus bar having a portion exposed at said hole whereby it may be engaged by a bus bar engaging prong of a branch circuit plug inserted into the duct through said hole, an insulation structure having a part so proportioned to the hole that it may be projected therethrough, and having a part so proportioned to the hole that it may not be projected therethrough, the shoulder thus provided engaging said duct wall to limit movement of the structure in the duct hole, the structure sealing the hole and adapted to be assembled with respect to the duct around the bus bar and removed from the duct and from around the bus bar without requiring severance or mutilation of the bus bar, the structure having a part provided with a surface outside the duct, the structure having a prong way opening to the surface and leading into the duct to a bus bar in said prong way, the structure isolating the prong way and the exposed portion of the bus bar therein.

26. In an electrical distribution system, a duct having a wall normally stationary with respect to the duct as a whole and provided with an opening, bus bars having portions exposed at said hole whereby they may be engaged by bus bar engaging prongs of a branch circuit plug inserted into the duct through said hole, an insulation structure having a part so proportioned to the hole that it may be projected therethrough and having a part so proportioned to the hole that it may not be projected therethrough, the shoulder thus provided engaging said duct wall to limit movement of the structure in the duct hole, the structure sealing the hole and adapted to be assembled with respect to the duct around the bus bars and removed from the duct and from around the bus bars without requiring severance or mutilation of the bus bars, the structure having a part provided with a surface outside the duct, the structure having prong ways opening to the surface and leading into the duct to the bus bars, the structure isolating the prong ways.

27. In an electrical distribution system, a duct having a wall normally stationary with respect to the duct as a whole and provided with an opening, bus bars having portions exposed at said hole whereby they may be engaged by bus bar engaging prongs of a branch circuit plug inserted into the duct through said hole, an insulation structure having a part so proportioned to the hole that it may be projected therethrough and having a part so proportioned to the hole that it may not be projected therethrough, the shoulder thus provided engaging said duct wall to limit movement of the structure in the duct hole, the structure sealing the hole and adapted to be assembled with respect to the duct around the bus bars and removed from the duct and from around the bus bars without requiring severance or mutilation of the bus bars, the structure having a part provided with a surface outside the duct, the structure having prong ways opening to the surface and leading into the duct to the bus bars in said prong ways, the structure isolating the prong ways and the bus bars therein.

28. In an electrical distribution system, a duct having a wall normally stationary with respect to the duct as a whole and provided with longitudinally spaced openings, a bus bar having portions exposed at said holes whereby it may be engaged by bus bar engaging prongs of branch circuit plugs inserted into the duct through said holes, insulation structures at certain holes, each having a part so proportioned to each hole that it may be projected therethrough and having a part so proportioned to the hole that it may not be projected therethrough, the shoulder thus provided engaging said duct wall to limit movement of the structure in the duct hole, the structures sealing the holes and adapted to be assembled with respect to the duct around the bar and removed from the duct and from around the bus bar without requiring severance or mutilation of the bus bar, each structure having a part provided with a surface outside the duct, each structure having a prong way opening to the surface and leading into the duct to the bus bar, the structure isolating the prong way, the structures being transferable to and from holes without requiring mutilation of the bus bar, and shutters for holes not equipped with such structures.

29. In an electrical distribution system, a duct having a wall normally stationary with respect to the duct as a whole and provided with longitudinally spaced openings, a bus bar having portions exposed at said holes whereby it may be engaged by bus bar engaging prongs of branch circuit plugs inserted into the duct through said holes, insulation structures at certain holes, each having a part so proportioned to each hole that it may be projected therethrough and having a part so proportioned to the hole that it may not be projected therethrough, the shoulder thus provided engaging said duct wall to limit movement of the structure in the duct hole, the structures sealing the holes and adapted to be assembled with respect to the duct around the bar and removed from the duct and from around the bus bar without requiring severance or mutilation of the bus bar, each structure having a part provided with a surface outside the duct, each structure having a prong way opening to the surface and leading into the duct to the bus bar in said prong way, the structure isolating the prong way and the exposed portion of the bus bar therein, the structures being transferable to and from holes without requiring mutilation of the bus bar, and shutters for holes not equipped with such structures.

30. In an electrical distribution system, a duct having a wall normally stationary with respect to the duct as a whole and provided with longitudinally spaced openings, bus bars having portions exposed at said holes whereby they may be engaged by bus bar engaging prongs of branch circuit plugs inserted into the duct through said holes, insulation structures at certain holes, each having a part so proportioned to each hole that it may be projected therethrough and having a part so proportioned to the hole that it may not be projected therethrough, the shoulder thus provided engaging said duct wall to limit movement of the structure in the duct hole, the structures sealing the holes and adapted to be assembled with respect to the duct around the bus bars and removed from the duct and from around the bus bars without requiring severance or mutilation of the bus bars, each structure having a part provided with a surface outside the duct, each structure having prong ways opening to the surface and leading into the duct to the bus bars, the structures isolating the prong ways, the structures being transferable to and from holes without requiring mutilation of the bus bars, and shutters for holes not equipped with such structures.

31. In an electrical distribution system, a duct having a wall normally stationary with respect to the duct as a whole and provided with longitudinally spaced openings, bus bars having portions exposed at said holes whereby they may be engaged by bus bar engaging prongs of branch circuit plugs inserted into the duct through said holes, insulation structures at certain holes, each having a part so proportioned to each hole that it may be projected therethrough and having a part so proportioned to the hole that it may not be projected therethrough, the shoulder thus provided engaging said duct wall to limit movement of the structure in the duct hole, the structures sealing the holes and adapted to be assembled with respect to the duct around the bus bars and removed from the duct and from around the bus bars without requiring severance or mutilation of the bus bars, each structure having a part provided with a surface outside the duct, each structure having prong ways opening to the surface and leading in to the duct to the bus bars in said prong ways, the structures isolating the prong ways and the bus bars therein, the structures being transferable to and from holes without requiring mutilation of the bus bars, and shutters for holes not equipped with such structures.

HARRISON J. L. FRANK.